United States Patent [19]
Harrison

[11] Patent Number: 5,609,200
[45] Date of Patent: Mar. 11, 1997

[54] INTEGRAL ROOF COOLING CONTAINER

[75] Inventor: David C. Harrison, Albuquerque, N.M.

[73] Assignee: Zomeworks Corporation, Albuquerque, N.M.

[21] Appl. No.: 277,925

[22] Filed: Jul. 20, 1994

[51] Int. Cl.[6] ........................................ F28D 15/00
[52] U.S. Cl. ................ 165/104.19; 165/904; 165/56; 62/467
[58] Field of Search ................ 165/32, 104.19, 165/56, 904; 62/467

[56] References Cited

U.S. PATENT DOCUMENTS

| | | |
|---|---|---|
| 2,187,954 | 1/1940 | Smith . |
| 2,231,101 | 2/1941 | Winship . |
| 2,364,144 | 12/1944 | Hunsaker ........................ 429/130 |
| 2,527,782 | 10/1950 | Williams . |
| 2,636,371 | 4/1953 | Stephens . |
| 3,514,508 | 5/1970 | Schott et al. . |
| 3,903,958 | 9/1975 | Hay . |
| 3,995,080 | 11/1976 | Cogburn et al. . |
| 4,023,257 | 5/1977 | Wright et al. . |
| 4,062,351 | 12/1977 | Hastwell ........................ 165/104.19 |
| 4,082,080 | 4/1978 | Pittinger ........................ 165/32 |
| 4,089,916 | 5/1978 | Hay . |
| 4,143,193 | 3/1979 | Rees . |
| 4,214,670 | 7/1980 | Berger et al. . |
| 4,237,965 | 12/1980 | Hay . |
| 4,350,200 | 9/1982 | McElwain ........................ 165/104.19 |
| 4,357,293 | 11/1982 | Williamson, Jr. . |
| 4,847,028 | 7/1989 | Snyder et al. . |
| 4,980,112 | 12/1990 | Masters . |
| 5,070,933 | 12/1991 | Baer . |
| 5,094,607 | 3/1992 | Masters . |

Primary Examiner—Edward K. Look
Assistant Examiner—Mark Sgantzos
Attorney, Agent, or Firm—Townsend and Townsend and Crew LLP

[57] ABSTRACT

A passive temperature regulating system for cooling a structure exposed to extreme heat and a method for manufacturing the temperature regulator system. The system comprises at least one temperature regulator integrally formed to the roof of the structure. The temperature regulator is manufactured from a mold having a lower mold portion removably attached to an upper wall. The upper wall has an uneven lower surface and is adapted to be part of the roof. A resinous material is molded within the mold to form a container. After cooling, the lower portion is removed and the container remains an integral part of the upper wall because the melted plastic has conformed to the uneven lower surface of the upper wall. Thus, the container will remain in intimate contact with the roof, thereby supporting it own weight and eliminating the need for an expensive support system.

9 Claims, 4 Drawing Sheets

INTEGRAL ROOF COOLING CONTAINER

FIELD OF THE INVENTION

This invention relates to passive temperature regulating systems generally, and more specifically to an integral roof cooling system for passively cooling the interior of a structure exposed to extreme heat and cold.

BACKGROUND OF THE INVENTION

The interior spaces of structures exposed to extreme heat are typically cooled by active refrigeration and evaporative cooling systems. Unfortunately, such systems demand a substantial amount of electric or other type of external power which generates large operating costs in addition to the initial cost of the system. Refrigeration systems use almost as much electrical energy to power fans and pumps, and require constant replenishment of their water supply.

The cost of active cooling systems is not always prohibitive in structures designed for human habitation or use, such as homes, office buildings, factories and the like. However, cooling systems are often desirable in other types of structures where the installation and operating costs of active cooling systems cannot be justified, such as relatively small or remote structures designed to house livestock or electrical or fiber-optic equipment. It is often not feasible to bring electricity to a remote structure or to provide for the generation of electricity on-site, or to provide an alternative source of power. As a result, active cooling systems often cannot be used in situations in which some form of temperature control is highly desirable.

In an attempt to solve the above problems, passive cooling systems have been developed to provide cooling by passively radiating heat to the night sky. One such system is disclosed in commonly assigned U.S. Pat. No. 5,070,933 to Baer, the complete disclosure of which is incorporated herein by reference. In this cooling system, a plurality of plastic containers filled with water and insulation are mounted to the roof of the structure. The insulation contains vertical passages so that the water may flow between the upper and lower walls of the container. During the evening, relatively cold water, chilled by the night atmosphere, flows downwardly through the vertical passages in the insulation towards the lower wall of the container and cools the interior of the structure by heat transfer. During the day, the insulation and water minimize the penetration of heat from the outside.

One problem with existing passive cooling systems such as the above referenced patent is that the plastic containers filled with water and insulation are heavy. Therefore, these systems typically include a large and relatively expensive support system to hold the plastic containers against the roof of the structure. In addition, gravity and thermal stresses eventually cause the heavy plastic containers to sag away from the roof Of the structure. This decreases the heat transfer from the water to the cool night air because the plastic containers are no longer in intimate contact with the roof.

Another problem with existing passive cooling systems is that the plastic containers will deform with severe changes in temperature. Since thermal deformation tends to have a permanent effect on plastic (plastic, unlike metals, does not have a "memory" for its original shape), the plastic containers will not completely return to their original shape after these severe temperature changes. This permanent deformation of the containers can have a detrimental effect on the heat transfer characteristics of the temperature regulating system.

SUMMARY OF THE INVENTION

The present invention is directed to a passive temperature regulating system for cooling a structure exposed to extreme heat and cold and a method of manufacturing the temperature regulator system. The invention provides a relatively inexpensive cooling system integrally formed to the roof of the structure that eliminates the need for an expensive support system and alleviates the above described problems of sagging and permanent thermal deformation.

In one aspect of the invention, the passive temperature regulating system comprises an enclosure including a roof with an uneven interior surface. At least one temperature regulator is integrally formed to the interior surface of the roof. Each temperature regulator comprises a molded container having an inner chamber and an upper surface molded to the uneven interior surface such that the upper surface substantially conforms to the interior surface thereby rigidly securing the container to the roof. A supply of water fills the chamber and is in contact with essentially the entire effective heat transfer area of the upper surface. Insulation is disposed in the chamber adjacent the upper surface with passages that allow the water to flow vertically through or around the insulation.

An important advantage of the system is that the upper surface of the container has been molded to the interior surface of the roof such that the container has become an integral part of the roof. Thus, the container will remain in intimate contact with the roof, thereby supporting its own weight and eliminating the need for an expensive support system. In addition, the uneven interior surface increases the heat transfer area between the container and the roof, thereby facilitating convection with the cool night air and radiation to the cool night sky.

The above described temperature regulator is manufactured from a mold having a lower mold portion removably attached to an upper wall section. The upper wall section has an uneven lower surface and is adapted to be part of the roof of the structure. A resinous material, such as plastic, is melted and molded to form a container that conforms to the inner surface of the lower mold portion and the uneven lower surface of the upper wall. The mold and the container are then cooled and the lower portion is removed. The container will remain fixed to the upper wall because the melted plastic has conformed to the uneven lower surface thereby integrating the container with the upper wall.

In one embodiment, the uneven lower surface includes channels extending downward from the surface so that the upper surface of the container conforms around the channels. During the rotational molding step, the melted plastic material will flow evenly around the channels and the lower surface of the upper wall. When the plastic and mold cool, the plastic will adhere to the channels so that the newly formed container is secured to the upper wall. Thus, a portion of the mold (the upper wall) becomes an integral part of the product (the container). In other embodiments, the uneven lower surface may include depressions or protrusions in this surface so that the melted plastic flows into the depressions or around the protrusions to secure the container to the upper wall.

In a preferred embodiment, a small opening is formed in the container to insert the insulation and water after the container has been molded to the upper wall. The insulation is movable between an elongated configuration, where the insulation is adapted for introduction through the small opening, and a collapsed configuration, where the insulation generally conforms to the upper surface of the container. With this configuration, a generally rectangular slab of insulation can be inserted into the plastic container without substantially removing or altering the outer walls of the container.

To minimize permanent thermal deformation of the plastic container, the temperatures regulator preferably includes elastic members, such as springs or metal reinforcement, surrounding the container. The elastic members bias the containers so that the containers will generally return to their original shape after they have been deformed by a severe temperature change, such as an extensive freeze thaw cycle.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
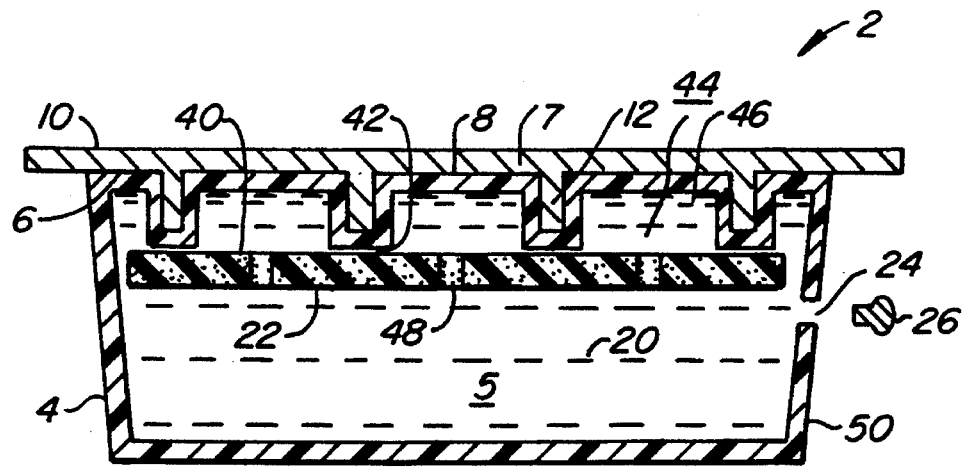
FIG. 1 is a side cross-sectional view of the temperature regulator in accordance with the principles of the present invention.

Referring to the drawings in detail, wherein like numerals indicate like elements, the temperature regulating system is illustrated according to the principles of the present invention.

As illustrated in FIG. 1, temperature regulator 2 comprises a container 4 defining an inner chamber 5 and having an upper wall 6 with an upper surface 7 molded to a lower surface 8 of a thermally conductive planar element or a wall section 10. Wall section 10 is adapted to form part of the roof of a structure and is preferably constructed of a highly conductive material, such as aluminum or steel, to facilitate heat transfer through wall 10. Container 4, on the other hand, is constructed using a material with a relatively low thermal conductivity and which is a poor conductor of heat, such as plastic (the heat transfer characteristics of wall 10 and container 4 will be discussed in greater detail below).

Lower surface 8 of wall 10 includes a plurality of protrusions or depressions to create an uneven lower surface for rigidly securing container 4 to the planar element or wall section 10. In a preferred configuration, lower surface 8 of wall 10 includes a plurality of channels 12 spaced apart from each other and extending downward into container 4. Upper surface 7 of container 4 has been molded to wall 10 so that it substantially conforms to channels 12 and lower surface 8, as shown in FIG. 1. Preferably, channels 12 will comprise the same material as wall 10 or at least the same material as lower surface 8 of wall 10. Channels 12 serve to lock the plastic container 4 to the metal wall 10 when these two parts are molded together so that upper surface 7 becomes an integral part of lower surface 8 (this method will be discussed below). Channels 12 also increase the surface area of lower surface 8 thereby increasing the effective heat transfer area between container 4 and wall 10.

It should be noted that the invention is not limited to channels 12 extending from lower surface 8. Lower surface 8 can have a variety of shapes so long as it has a generally uneven surface so that melted plastic will flow over shapes or through holes in lower surface 8 to lock the plastic to the metal wall 10 (discussed below). For example, lower surface 8 could have a series of depressions, protrusions such as ridges, fins or bumps, or a combination of these features.

Container 4 houses water 20, the thermal mass of the regulator, and insulation 22 suspended in the upper region of container 4. The water 20 absorbs and transfers heat from the system (described below). Container 4 further includes a port 24 which permits container 4 to be filled with or drained of water 20. Port 24 also provides a way in which to introduce insulation 22 into container 4, as described in further detail below. Port 24 can be sealed with a plug 26 or with other sealing means conventionally known in the art, so that the water 20 is retained in container 4.

Figure 2A:
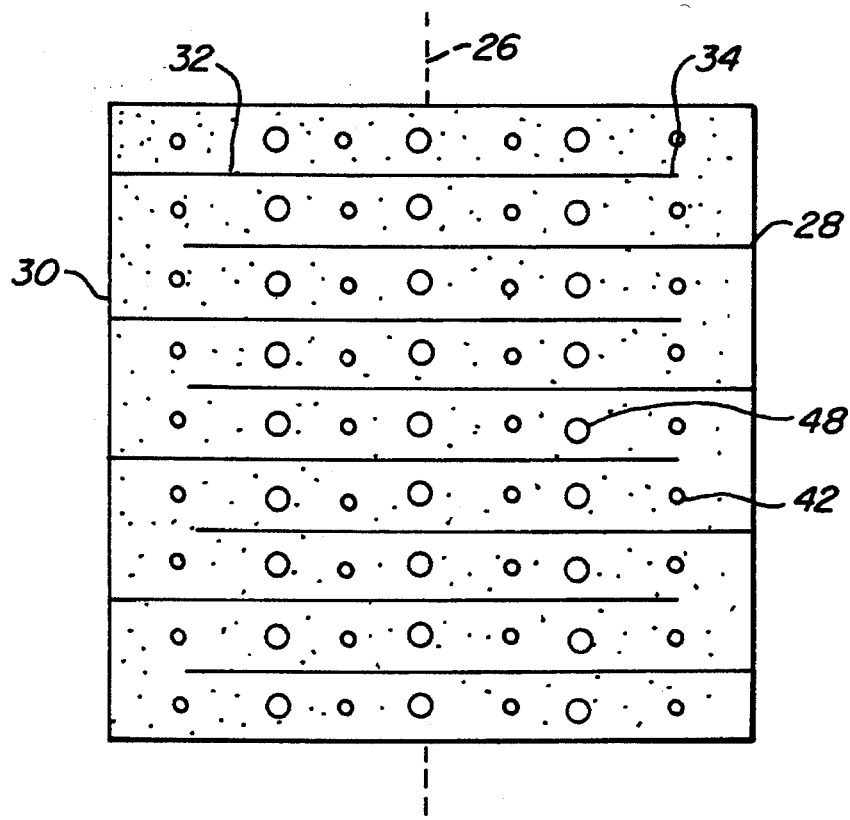
FIG. 2A is a top view of a slab of insulation for the temperature regulator of FIG. 1.
Figure 2B:
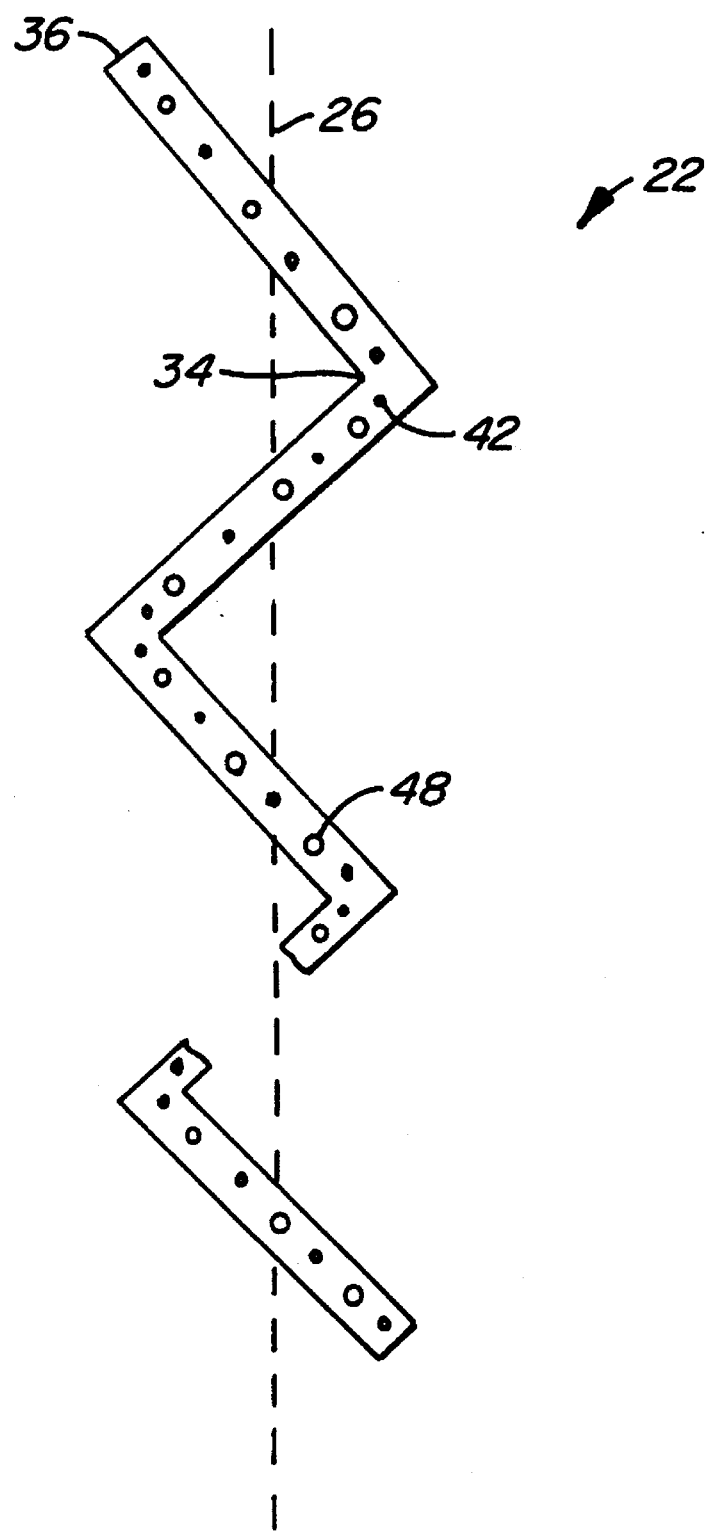
FIG. 2B is a top view of the insulation of FIG. 2A in an expanded position for insertion into the temperature regulator of FIG. 1.

Insulation 22 is preferably a single slab buoyant enough to float near the upper region of container 4. Insulation 22 is movable between a collapsed configuration (FIG. 2A), where insulation 22 generally conforms to the shape of the upper region of container 4, and an elongated configuration (FIG. 2B), where insulation 22 is configured for introduction through port 24. As shown in FIG. 2A, insulation 22 has a longitudinal axis 26 and first and second ends 28, 30 on opposite sides of axis 26. A series of lateral cuts 32 have been formed in insulation 22 from one end to a point 34 proximate the opposite end. Lateral cuts 32 extend completely through insulation 22 so that insulation 22 can be extended into the Z configuration shown in Fib. 2B. To position insulation 22 within container, a distal tip 36 of insulation is introduced through port 24 and the rest of insulation 22 guided through port 24 into container 4. With this configuration, insulation 22 can be positioned within container 4 without substantially removing or altering one of the outer walls of container 4.

Insulation 22 is preferably constructed of a resilient material so that insulation 22 is naturally biased into the collapsed configuration of FIG. 2A. Preferably, this configuration is generally rectangular so that insulation 22, after being completely introduced through port 24 of container 4, will reassemble into the collapsed configuration to conform to the effective heat transfer area of wall section 10. It will be noted, however, that insulation 22 is not limited to a single slab of material. For example, insulation 22 could comprise a plurality of smaller elements such as hollow plastic or foam spheres, as disclosed in U.S. Pat. No. 5,070,933 to Baer, which has been incorporated herein by reference.

Referring again to FIG. 1, insulation 22 has an upper surface 40 with vertical projections 42 so that a space or gap 44 is formed between insulation 22 and lower surface 46 of upper wall 6 of container 4. Otherwise, the buoyancy of insulation 22 would cause its upper surface 40 to come into contact with upper wall 6 of container 4, displace the water 20 therebetween, and seriously impede heat transfer from wall section 10 to the thermal mass of temperature regulator 2. Note that channels 12 may be also used to form gap 44 because they extend downward from wall 10. However, vertical projection 42 may be necessary if wall 10 contains depressions or extremely small protrusion instead of channels 12, as discussed above.

Insulation 22 also includes vertical passages 48 that permit water 20 in container 4 to flow from the region below insulation 22 to gap 44. As discussed below, warmer water will tend to rise through vertical passages 46 thereby displacing cooler water in the upper region of chamber 5.

Container 4 has been molded into a generally rectangular shape having outer walls 50 with an outer contour. However, severe temperature changes, such as a long cold spell followed by a warmer period, may cause the plastic container 4 to deform so that outer walls 50 lose their original shape or contour. To alleviate this problem, springs (not shown) may be disposed outside of chamber 5 to bias container 4 so that outer walls 50 return to their original shape after being thermally deformed by temperature changes. Alternatively, outer walls 50 of container 5 may have a metal reinforcement (not shown) so that the walls will behave similarly to metals (i.e. retaining a "memory" of their original shape so that thermal deformation is only temporary).

Figure 3A:
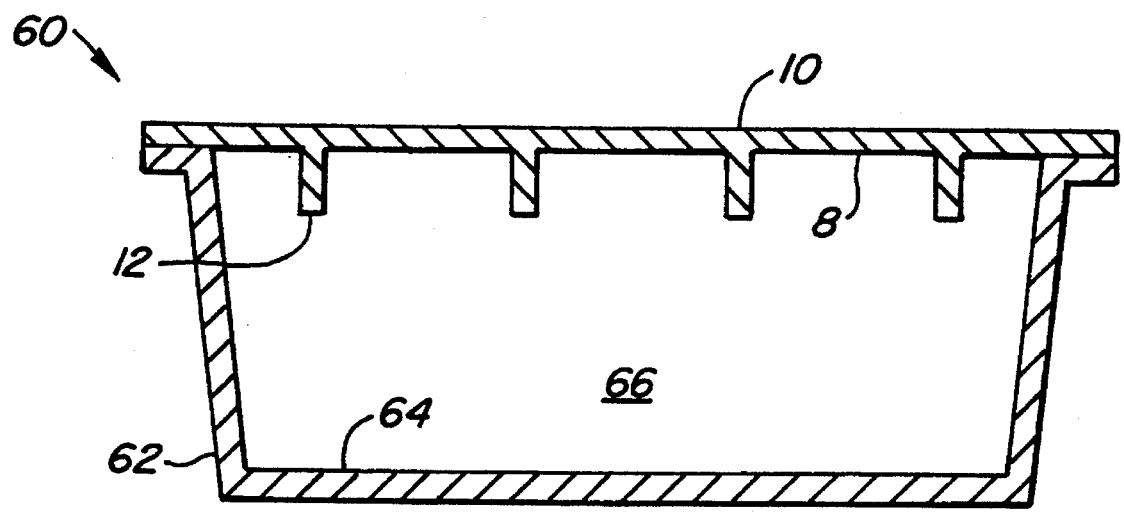
FIGS. 3A–3C are diagrammatic views illustrating a method of manufacturing the temperature regulator of FIG. 1.
Figure 3B:
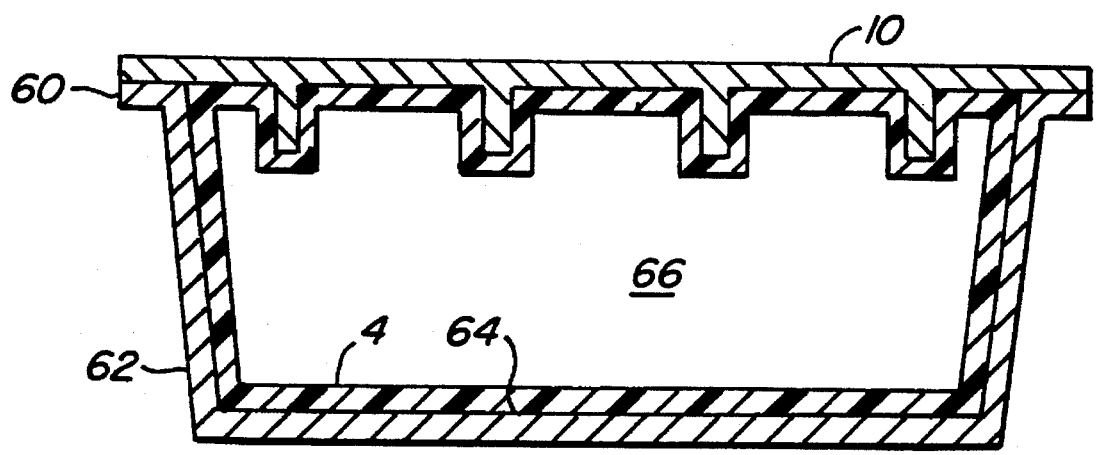
Figure 3C:
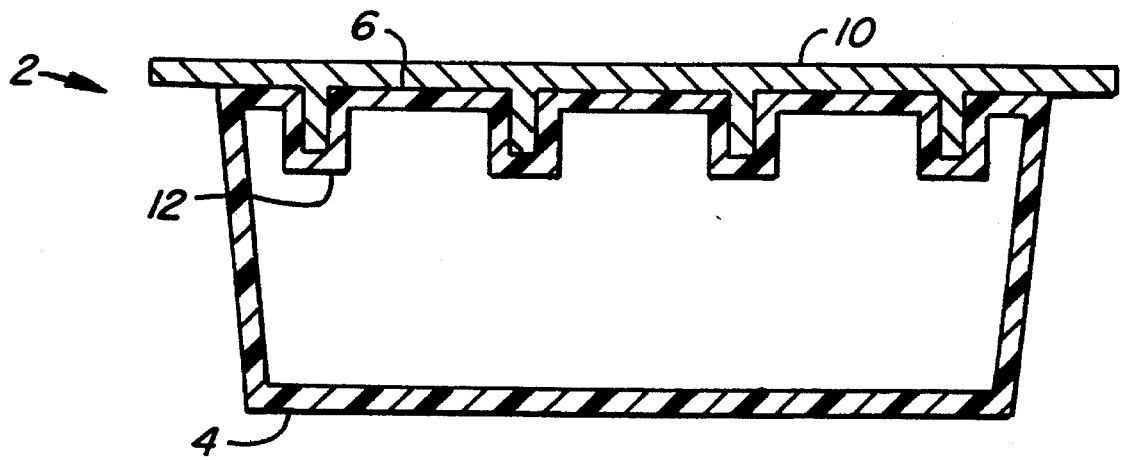

Referring to FIGS. 3A–3C, the method for manufacturing temperature regulator 2 in accordance with the present invention will now be described. Container 4 is preferably formed by rotationally molding a resinous material such as plastic within a mold 60. Of course, the invention is not limited to the rotational molding technique that will be described below. For example, container 4 could be manufactured by blow molding, injection molding or other conventional techniques.

Referring to FIG. 3A, mold 60 comprises wall section 10 (i.e. a section of the roof of the structure) and a lower mold portion 62 having an inner surface 64 surrounding a mold cavity 66. Channels 12 extend from wall section 10 into mold cavity 66. Lower mold portion 62 is preferably constructed of metal, such as aluminum or steel, and is removably attached to wall 10 by conventional means, such as clamps, screws or rivets. Inner surface 64 will preferably be as smooth as possible to facilitate the separation of container 4 (shown in FIG. 3C) from lower mold portion 62 after container 4 has been formed.

To rotationally mold container 4, the plastic, generally in the form of pellets (not shown), is placed within mold cavity 66. Mold 60 is then attached to the arm of a rotational molding machine (not shown) and transferred to an oven (also not shown). The oven heats mold 60, thereby melting the plastic while the rotational molding machine simultaneously rotates mold 60 about two axes in a conventional manner. The melted plastic will tend to flow to the lowest point in mold cavity 66 as the mold 60 is biaxially rotated, thereby completely covering inner surface 64 of lower mold portion 62 and lower surface 8 and channels 12 of wall 10.

As shown in FIG. 3B, after the inner surfaces of mold 60 are uniformly coated, the mold 60 is cooled so that the plastic hardens into container 4. After the mold 60 is cooled, lower mold portion 62 is removed from container 4 and wall 10, as shown in FIG. 3C. Note that lower mold portion 62 can easily be removed from the hardened plastic because inner surface 64 is relatively smooth. However, wall 10 remains fixed to container 4 because the melted plastic conforms to channels 12 so that the plastic locks to the metal, thereby integrating wall 10 with upper surface 6 of container 4.

After lower mold portion 62 has been removed, port 24 is formed in container 4 by conventional means. Insulation 22 is then stretched into the elongated configuration of FIG. 2B and introduced through port 24. Once insulation 22 is completely within container 4, it will naturally spring back into the collapsed position of FIG. 2A to substantially conform to the effective heat transfer area of upper surface 6. Container 4 is then partially filled with water 20 and port 24 is resealed by conventional means.

Figure 4:
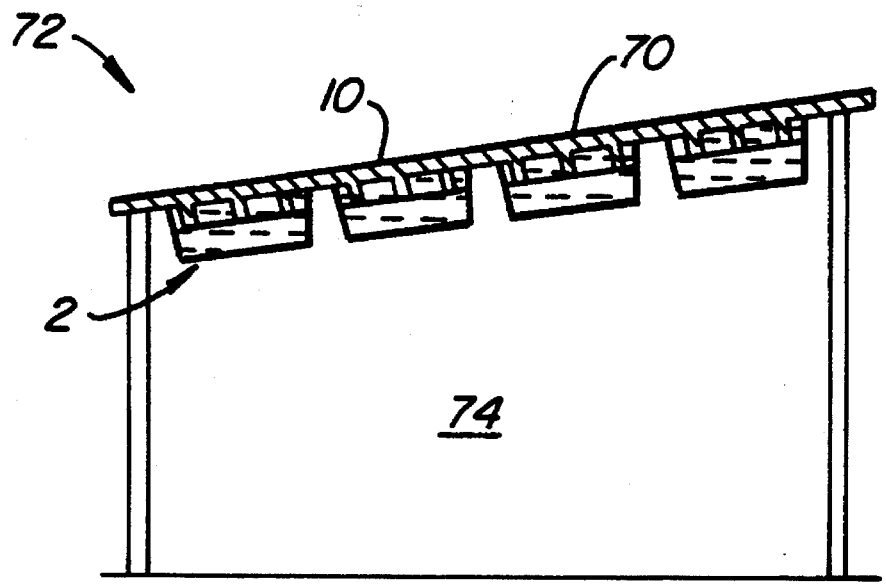
FIG. 4 is a sectional view of the temperature regulating system in accordance with the principles of the present invention.
Figure 5:
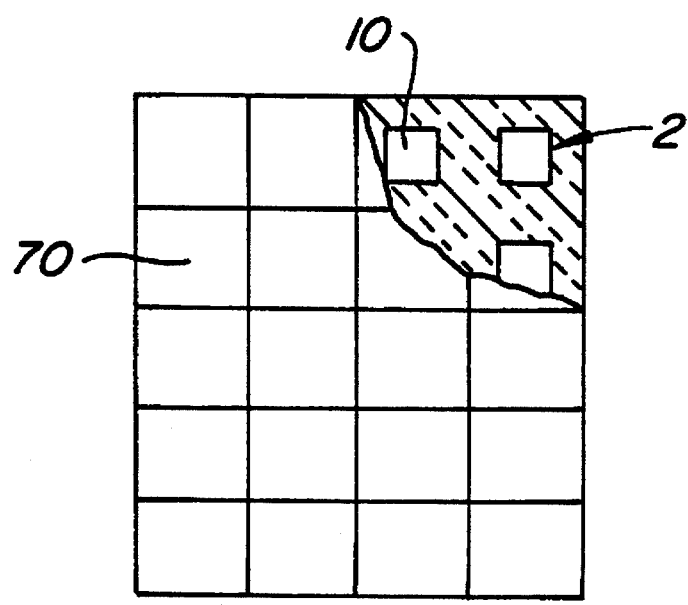
FIG. 5 is a bottom plan view of the temperature regulating system of FIG. 4 with a portion thereof taken in partial cross-section.

Referring to FIGS. 4 and 5, a plurality of regulators 2 are shown as being secured to a roof 70 of a storage room or enclosure 72 to regulate the temperature of the interior space 74 of enclosure 72. Roof 70 is formed of a plurality of wall sections 10 that have been molded to containers 4, as discussed above. Containers 4 are integrated to wall sections 10 and, therefore, will remain in intimate contact with roof 70 to provide an effective heat transfer surface therebetween.

The temperature regulating system operates by disposing heat during the night, slowly warming during the day, and then cooling again after sundown. During the day, when roof 70 is heated by solar radiation, insulation 22 and water 20 within containers 4 provide a substantial barrier to the transfer of heat into the structure. At night, the radiation of heat from the roof 70 into the night sky cools water 20 above insulation 22 so that it becomes cooler than water 20 below insulation 22. Since warmer water tends to rise, the warmer water will circulate upwardly through vertical passages 48 in insulation 22 so that the entire water mass is cooled by a combination of convection and radiation to the night sky. A complete description of this heat transfer process is described in commonly assigned U.S. Pat. No. 5,070,933 to Baer.

The above is a detailed description of various embodiments of the invention. It is recognized that departures from the disclosed embodiments may be made within the scope of the invention and obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A temperature regulator for use with a roof of a structure comprising:

a thermally conductive planar element having an uneven lower surface;

a molded container defining an inner chamber and having an upper surface integrally molded to the planar element such that the upper surface substantially conforms to the uneven lower surface thereby rigidly securing the container to the planar element;

a supply of water within the chamber, the water being in contact with a portion of a heat transfer area of the upper surface; and insulation disposed in the chamber and located adjacent the upper surface, the insulation defining passages that allow the water to flow vertically through or around the insulation, wherein the planar element contains a plurality of channels extending from the lower surface, the upper surface of the container conforming to the channels, whereby heat is radiated from the water through the roof into the night sky, and heat transfer to an interior of the structure is minimized during the day by the insulation and the water.

2. The regulator of claim 1 wherein the upper surface of the container is an integral part of the lower surface of the planar element.

3. The regulator of claim 1 wherein the uneven lower surface has a plurality of protrusions, the upper surface of the container conforming to the protrusions.

4. The regulator of claim 1 wherein the planar element is constructed of metal.

5. The regulator of claim 1 wherein the container is constructed of plastic, the plastic being rotationally molded onto the lower surface of the planar element.

6. The regulator of claim 1 wherein the channels increase the surface area of the lower surface thereby increasing the effective heat transfer area between the lower surface and the upper surface of the container.

7. A passively cooled structure comprising:

an enclosure including a roof having an interior surface that defines the upper boundary of an interior space, the roof having channels extending from the interior surface into the interior space to increase the effective heat transfer area of the interior surface; and at least one temperature regulator positioned in the enclosure, each temperature regulator comprising:

a molded container defining an inner chamber and having an upper wall integrally molded to the roof such that the upper wall is an integral part of the interior surface and the channels thereby rigidly securing the container to the roof;

a supply of water filling the chamber, the water being in contact with essentially the entire effective heat transfer area of the upper planar element; and insulation disposed in the chamber and located adjacent the upper wall, the insulation defining passages that allow the water to flow vertically through the insulation, whereby heat is radiated from the water through the roof into the night sky, and heat transfer to an interior of the enclosure is minimized during the day by the insulation and the water.

8. The regulator of claim 7 wherein the roof is constructed of metal.

9. The regulator of claim 7 wherein the container is constructed of plastic, the plastic being rotationally molded onto the interior surface and the channels of the roof.

* * * * *